Patented Aug. 30, 1932

1,874,633

UNITED STATES PATENT OFFICE

JUNJIRO SATO AND SHIGERU TIMIKAWA, OF JACKSON, MICHIGAN

COMPOSITION OF MATTER

No Drawing.   Application filed November 14, 1927.   Serial No. 233,315.

This invention pertains to a novel composition of matter which is especially adapted for use in the manufacture of furniture or furniture parts, such as radio cabinets, loud speakers and other articles of a similar nature. The invention has reference more particularly to the use of certain hydrocarbon binders known as rosin, Parolite, Korite and gilsonite, combined with fine powdered coke, powdered slate, pure silica, fine powdered wood pulp and asbestos or selected ingredients of the latter group. Korite and Parolite are blown asphalts having a brownish color and are so described in Abraham's "Asphalts and Allied Substances", 2nd edition (corrected), page 289.

The product of the invention is a material which may be used in substitution of wood, although having somewhat greater density, and is adapted to receive the fine wood finishes that are now available on the market. By the use of this material it is possible to manufacture furniture of greater durability and less cost than ordinary wooden furniture. The material has considerable strength because of the intimate binding relation between the hydrocarbon binders and the other ingredients.

The invention will now be described more fully and specifically with reference to actual examples.

Example 1

Group A

| | Parts |
|---|---|
| Gilsonite | 20 |
| Korite | 20 |
| Rosin | 5 | or—

Group B

| | Parts |
|---|---|
| Gilsonite | 20 |
| Parolite | 28 |
| Rosin | 2 |

The three ingredients of Group A or of Group B are melted in three different iron vessels under considerable heat. When freely melted they are mixed together and to this mixture we add

| | Parts |
|---|---|
| Powdered coke | 3 |
| Pure silica | 15 |
| Fine flake asbestos | 20 |
| Fine powdered straw | 2 |

With the latter group of ingredients may be included 5 parts of slate powder and 5 parts of fine powdered wood pulp, if desired.

The whole mixture is now mixed well while being heated at a high temperature. It is next put into a high grade steel mold having a polished inner surface covered with soft soap, and the mixture is finally pressed to the desired shape by hydraulic pressure in the usual manner.

In connection with the mold it has been found that when same is prepared as above described the product is imparted a smooth and polished surface.

Example 2

| | Per cent |
|---|---|
| Korite (M. P. about 210 degrees F.) | 10 |
| Parolite (M. P. about 210 degrees F.) | 10 |
| Gilsonite (M. P. about 425 degrees F.) | 20 |
| Rosin (Low M. P.) | 5 |

These ingredients are heated and mixed as described above, and to the mixture we add

| | Per cent |
|---|---|
| Fine powdered coke | 7 |
| Fine pure silica | 18 |
| Fine slate powder | 8 |
| Fine asbestos | 18 |
| Fine powdered straw | 3 |
| Fine powdered wood pulp | 1 |

Parolite, Korite and gilsonite are hydrocarbon binders similar to asphalt and black in color. Gilsonite is a very good binder and has a brownish color and a high melting point. These substances are somewhat related in their properties, and only one of them is essential in a given composition, although the quality of the product may be varied by combining these substances and modifying the quantities used.

Rosin has the property, in addition to its low melting point, of producing the desired bright color in the finished article when combined with the hydrocarbon binders.

The powdered coke, powdered wood pulp and straw powder are necessary to reduce the weight of the product. The pulp and straw may be used alternatively, while the powdered coke adds body to the product at a very small cost. The market price of powdered coke or coal dust is between two and three dollars per ton.

It has been found that this composition, as already indicated, is susceptible to surfacing and finishing like wood and satisfactorily takes such finishes as Pyralin enamel, Viscola, Duco, mixed with a thinner and similar substances applied with a hand brush or air brush, so that a wooden article is well imitated.

The objects of the invention are satisfied broadly by a mixture of a plastic hydrocarbon or binder with a powdered filler such as coke or straw. Obviously the character of the product may be modified and controlled by the varied use of the several ingredient already described.

Although the invention has been described with reference to specific examples and quantities, it will be understood that the invention is susceptible to variation and modification as indicated by the appended claims.

What we claim is:

1. A composition of matter of the character described consisting of a fused mixture of 2 per cent rosin, 48 per cent of blown asphalt and gilsonite to which are added 3 per cent powdered coke, 15 per cent pure silica, 5 per cent slate powder, 20 per cent asbestos, 5 per cent wood pulp, 2 per cent powdered straw.

2. A composition of matter of the character described consisting of 20 per cent gilsonite, 20 per cent of blown asphalt and 5 per cent rosin to which are added 7 per cent powdered coke, 18 per cent pure silica, 8 per cent slate powder, 3 per cent powdered straw, 1 per cent fine powdered wood pulp and 18 per cent fine asbestos.

3. A composition of matter of the character described consisting of a mixture of rosin, a blown asphalt and gilsonite to which are added powdered coke, slate powder, pure silica, powdered straw, powdered wood pulp and fine asbestos.

4. A composition of matter of the character described consisting of a mixture of 5 per cent rosin, and 40 per cent of a blown asphalt and gilsonite, to which are added 55 per cent of powdered coke, slate powder, pure silica, powdered straw, powdered wood pulp and fine asbestos.

In testimony whereof we affix our signatures.

JUNJIRO SATO.
SHIGERU TOMIKAWA.